United States Patent Office 3,590,041
Patented June 29, 1971

3,590,041
NOVEL HALO-SUBSTITUTED CINNAMIC ACID HETEROCYCLIC AMIDES
Manfred Kleemann, Wolfgang Grell, Gerhard Dahms, Hans Machleidt, and Albrecht Eckenfels, Biberach an der Riss, Germany, assignors to Boehringer Ingelheim GmbH, Ingelheim, Germany
No Drawing. Continuation-in-part of application Ser. No. 777,889, Nov. 21, 1968. This application Dec. 15, 1969, Ser. No. 885,256
Claims priority, application Austria, Dec. 1, 1967, A 10,911/67; Nov. 5, 1968, A 10,755/68, A 10,756/68; May 23, 1969, A 4,946/69
Int. Cl. C07d 29/14, 87/30
U.S. Cl. 260—240                                3 Claims

ABSTRACT OF THE DISCLOSURE

Compounds of the formula

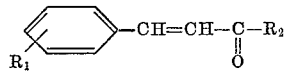

wherein:

$R_1$ is chlorine, bromine or iodine, preferably in 4-position, and
$R_2$ is piperidino, 4-hydroxy-piperidino or morpholino, with the proviso that when $R_1$ is chlorine, $R_2$ is only 4-hydroxy-piperidino, useful as antiphlogistics and antipyretics is warm-blooded animals.

---

This is a continuation-in-part of copending application Ser. No. 777,889, filed Nov. 21, 1968, now abandoned.

This invention relates to novel cinnamic acid amides, as well as to various methods of preparing them.

More particularly, the present invention relates to compounds of the formula

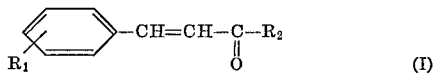

wherein:

$R_1$ is chlorine, bromine or iodine, preferably in 4-position, and
$R_2$ is piperidino, 4-hydroxy-piperidino or morpholino, with the proviso that when $R_1$ is chlorine, $R_2$ is only 4-hydroxy-piperidino.

A compound embraced by Formula I above may be prepared by the following methods:

METHOD A

By reacting a cinnamic acid derivative of the formula

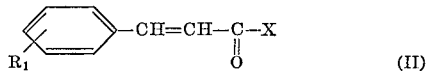

wherein:

$R_1$ has the same meanings as in Formula I, and
X is hydroxyl, amino, mono-lower alkyl-amino, di-lower alkyl-amino or a reactive substituent, such as halogen, alkoxy or acyloxy, with a heterocyclic amine of the formula

wherein $R_2$ has the same meanings as in Formula I.

The reaction is advantageously performed in the presence of a solvent, such as water, chloroform or benzene, and optionally in the presence of a tertiary amine or of a stoichiometric excess of the amine of the Formula III or of an inorganic base, such as an alkali metal hydroxide or an alkali metal carbonate, at a temperature between 0 and 160° C. A tertiary amine and/or a secondary amine of the Formula III may also simultaneously serve as the solvent medium. However, the reaction will also proceed without a solvent.

In those instances where X in Formula II is hydroxyl, amino or lower alkyl-substituted amino, the reaction is advantageously performed at a temperature between 200 and 250° C., and, if necessary, in a closed pressure vessel.

METHOD B

By forming, optionally in situ, a reactive derivative of a compound of the Formula II, for instance with carbonyl-diimidazole, thiocarbonyl-diimidazole or a carbodiimide, and reacting said reactive derivative with an amine of the Formula III; or by forming, optionally in situ, a reactive derivative of an amine of the Formula III, for instance with phosphorus trichloride [see Liebigs Ann. Chem. 580, 68 (1953)], and reacting said reactive derivative with a compound of the Formula II.

METHOD C

By olefination of an aldehyde of the formula

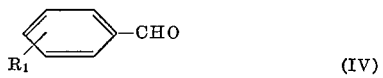

wherein $R_1$ has the same meanings as in Formula I, with a compound of the formula

wherein $R_2$ has the same meanings as in Formula I, and $$A \text{ is } (R_3O)_2\underset{\underset{O}{\downarrow}}{P}-CH_2- \text{ or } (R_4)_3P=CH-$$

where $R_3$ is lower alkyl and $R_4$ is alkyl or aryl.
If A is

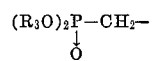

the compound of the Formula V is first transformed into its carbanion with a base, such as an alkali metal hydride, alkali metal amide, alkali metal alcoholate or alkali metal, in the presence of a solvent, such as dioxane, ether or benzene, and the carbanion is then reacted with an aldehyde of the Formula IV, preferably at a temperature between 20 and 80° C., to form a cinnamic acid amide. However, this reaction may also be performed with an alkali metal base in an aqueous organic solvent, such as with an alkali metal carbonate in an aqueous lower alkanol.

If A is $(R_4)_3-P=CH-$, an ylide of the Formula V, optionally without prior isolation, is reacted with an aldehyde of the Formula IV in the presence of an inert anhydrous solvent, such as dioxane or benzene, and preferably at a temperature between 20 and 100° C., such as at the boiling point of the particular solvent which is employed [see Organic Reactions, vol. 14, pages 270 et seq. (1965)].

The starting compounds required for methods A, B and C may be prepared pursuant to known methods. For instance, a compound of the Formula II may be obtained by olefination according to Wadsworth and Emmons, J.A.C.S. 83, 1733 (1961).

The preparation of an ylide of a compound of the Formula V may be effected by reacting a triaryl- or trialkyl-phosphine with a corresponding haloacetic acid amide, and treating the reaction product with a strong base [see Organic Reactions, vol. 14, pages 270 et seq. (1965)].

Finally, a compound of the Formula V may be prepared by reacting a trialkylphosphite with a corresponding haloacetic acid amide pursuant to Kosolapoff, Organophosphorus Compounds, pages 121 et seq., J. Wiley & Sons, Inc., New York, 1950.

The following examples further illustrate the present invention and will enable others skilled in the art to understand it more completely. It should be understood, however, that the invention is not limited solely to the particular examples given below.

PREPARATION OF STARTING COMPOUNDS (A) 4-bromo-cinnamic acid chloride 75.8 gm. (0.33 mol) of 4-bromo-cinnamic acid were suspended in chloroform, and the suspension was admixed with 119.0 gm. (1.0 mol) of thionyl chloride. The reaction mixture was refluxed at the boiling point for 10 hours, and the resulting solution was evaporated in vacuo. The remaining crude acid chloride, M.P. 107–108° C., was obtained with a quantitative yield.

(B) Diethylphosphone-acetic acid piperidide 624 gm. (3.8 mols) of triethylphosphite were added dropwise to 615 gm. (3.8 mols) of chloro-acetic acid piperidide at 100° C., whereby ethylchloride escaped from the reaction mixture. Subsequently, the reaction mixture was heated to 140° C. for 2 hours. By distillation 674 gm. (67% of theory) of the product, B.P. 136–137° C. at 0.05 mm. Hg, were obtained.

(C) Triphenyl-piperidino-carbonylmethyl-phosphonium-chloride 64.6 gm. (0.40 mol) of chloroacetic acid piperidide and 104.9 gm. (0.40 mol) of triphenylphosphine were dissolved in 600 ml. of toluene, and the solution was heated at 70° C. for 8 hours, while stirring. The precipitated salt was filtered off, washed with ether and dried. 116.2 gm. (68% of theory), M.P. 210–211° C., were isolated.

(D) Triphenyl-piperidino-carbonylmethylene-phosphorane 58.1 gm. (0.14 mol) of triphenyl-piperidino-carbonylmethyl - phosphonium - chloride were dissolved in water, and dilute sodium hydroxide was added at 0° C. until the solution reacted alkaline. The ylide was filtered off, washed with water and dried in vacuo over $P_2O_5$. Yield: 46.2 gm. (87% of theory), M.P. 174–179° C.

(E) Trispiperidino-phosphine

An ethereal solution of 11.0 gm. (0.08 mol) of phosphorus trichloride was added dropwise to a solution of 41.0 gm. (0.48 mol) of piperidine in absolute ether at 0° C. After refluxing the solution for 1 hour, the precipitated piperidine hydrochloride was filtered off. By evaporation of the filtrate in vacuo the desired product was obtained as an almost colorless oil which solidified quickly. Yield: 17.3 gm. (76% of theory).

(F) 4-bromo-cinnamic acid anhydride

A mixture of 25.0 gm. (0.11 mol) of 4-bromo-cinnamic acid and 56.0 gm. (0.55 mol) of acetic acid anhydride was refluxed for 8 hours. Then, the reaction solution was evaporated in vacuo, and the residue was treated with hot acetone in order to remove unreacted 4-bromo-cinnamic acid. The undissolved anhydride was recrystallized from absolute tetrahydrofuran. Yield: 6.6 gm. (28% of theory), M.P. 199–200° C.

EXAMPLE 1

Preparation of 4-bromo-cinnamic acid piperidide by method A

A suspension of 30.0 gm. (0.12 mol) of 4-bromo-cinnamic acid chloride in absolute ether was added slowly to a solution of 31.5 gm. (0.37 mol) of piperidine in absolute ether at 20° C. In order to complete the reaction, the mixture was stirred for 3 hours at 20° C., whereupon water was added and the main fraction of the product was filtered off. A further fraction was isolated from the ethereal phase. The product was recrystallized from petroleumether, whereby 23.9 gm. (68% of theory) of a colorless crystalline compound, M.P. 134° C., of the formula

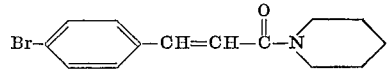

were obtained.

EXAMPLE 2

Using a procedure analogous to that described in Example 1, 3-bromo-cinnamic acid piperidide, M.P. 98–99° C. (from petroleumether), was prepared from 3-bromo-cinnamic acid chloride and piperidine. Yield: 84% of theory.

EXAMPLE 3

Using a procedure analogous to that described in Example 1, 3-iodo-cinnamic acid morpholide, M.P. 100–101° C. (from ethylacetate), of the formula

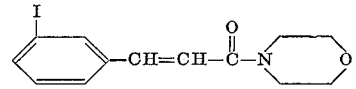

was prepared from 3-iodo-cinnamic acid chloride and morpholine. Yield: 33% of theory.

EXAMPLE 4

Using a procedure analogous to that described in Example 1, 4-iodo-cinnamic acid piperidide, M.P. 134–135° C. (from methanol), was prepared from 4-iodo-cinnamic acid chloride and piperidine. Yield: 83% of theory.

EXAMPLE 5

4-bromo-cinnamic acid piperidide

A suspension of 6.5 gm. (0.015 mol) of 4-bromo-cinnamic acid anhydride in 200 ml. of benzene was admixed at 20° C. with 2.5 gm. (0.03 mol) of piperidine. Subsequently, the mixture was refluxed for 2 hours, whereby a clear solution was formed. The solvent was removed in vacuo, the residue was taken up in ethylacetate and dilute sodium hydroxide was added. After filtering off the precipitate, the filtrate was evaporated in vacuo, and the residue was recrystallized from ethylacetate. Yield: 3.0 gm. (68% of theory), M.P. 134° C.

EXAMPLE 6

4-bromo-cinnamic acid piperidide 7.5 gm. (0.029 mol) of 4-bromo-cinnamic acid ethyl ester and 2.7 gm. (0.032 mol) of piperidine were added to a solution of 0.75 gm. (0.032 mol) of sodium in ethanol. The reaction mixture was allowed to stand for 2 days, and was then refluxed for 4 hours. After cooling it was filtered, and the filtrate was evaporated in vacuo. The residue was admixed with water and chloroform, and the organic phase was separated and dried over sodium sulfate. The solvent was removed in vacuo, and upon recrystallization of the residue from ethylacetate 1.0 gm. (12% of theory) of colorless crystals, M.P. 134° C., were obtained.

EXAMPLE 7

4-bromo-cinnamic acid piperidide

A solution of 8.9 gm. (0.035 mol) of 4-bromo-cinnamic acid dimethylamide and 16.0 gm. (0.19 mol) of piperidine in 200 ml. of benzene was heated in an autoclave at 200° C. for 16 hours. By column chromatography of the crude product on silicagel (benzene:acetone=3:1) 0.3 gm. (3% of theory) of 4-bromo-cinnamic acid piperidide of M.P. 134° C. was isolated.

EXAMPLE 8

4-bromo-cinnamic acid piperidide

A mixture of 11.3 gm. (0.05 mol) of 4-bromo-cinnamic acid and 4.3 gm. (0.05 mol) of piperidine was heated at 200° C. for 5 hours. After cooling, the reaction mixture was admixed with 2 N sodium hydroxide, and the precipitate formed thereby was filtered off and dissolved in chloroform. The unreacted 4-bromo-cinnamic acid was removed by washing the chloroform solution with 2 N sodium hydroxide. By evaporating the organic phase, 6.2 gm. (42% of theory) of colorless crystals, M.P. 134° C. (from isopropanol), were obtained.

EXAMPLE 9

4-bromo-cinnamic acid piperidide

While cooling with ice and stirring, 2.75 gm. (0.02 mol) of phosphorus trichloride were added dropwise to a solution of 5.1 gm. (0.06 mol) of piperidine in 50 ml. of dry pyridine. Stirring was continued for 30 minutes at room temperature, and then 11.4 gm. (0.05 mol) of 4-bromo-cinnamic acid were added in portions, and the mixture was heated at 50° C. for 2½ hours. Thereafter, the reaction solution was evaporated in vacuo, the residue was dissolved in chloroform, and the solution was washed with water, dilute sodium hydroxide and dilute hydrochloric acid. The product obtained by evaporating the chloroform phase was recrystallized from isopropanol. Yield: 4.6 gm. (31% of theory), M.P. 134° C.

EXAMPLE 10

4-bromo-cinnamic acid piperidide

A solution of 7.2 gm. (0.06 mol) of thionyl chloride in chloroform was added dropwise at room temperature to a mixture of 7.6 gm. (0.033 mol) of 4-bromo-cinnamic acid, 6.4 gm. (0.075 mol) of piperidine and chloroform. By an exothermic reaction a clear solution was formed. The solution was allowed to stand for 7 hours, then water was added, and the chloroform phase was separated, washed with dilute sodium hydroxide and then with water, dried over sodium sulfate and evaporated in vacuo. The residue was recrystallized from methanol and from ethylacetate. Yield: 3.1 gm. (32% of theory), M.P. 134° C.

EXAMPLE 11

Preparation of 4-iodo-cinnamic acid morpholide by method B 4.1 gm. (0.015 mol) of 4-iodo-cinnamic acid were suspended in chloroform and the suspension was admixed dropwise with a solution of 3.7 gm. (0.021 mol) of thiocarbonyldiimidazole [prepared from thiophosgene and imidazole according to Liebigs Ann. Chem. 657, 98 (1962)] in chloroform. The mixture was heated at the boiling point for 6 hours, whereupon a solution of 2.2 gm. (0.025 mol) of morpholine in chloroform was added dropwise, and then the mixture was stirred for 2 days at 20° C. Thereafter, the reaction mixture was filtered, and the oil obtained after evaporation of the solvent was dissolved in ethylacetate. After washing the solution first with dilute hydrochloric acid and then with dilute sodium hydroxide and drying it over sodium sulfate, the ethylacetate was evaporated in vacuo. The solid residue was recrystallized several times from methanol. Yield: 1.8 gm. (35% of theory), M.P. 175–177° C.

EXAMPLE 12

Preparation of 3-bromo-cinnamic acid piperidide by method B

A solution of 4.55 gm. (0.020 mol) of 3-bromo-cinnamic acid and 1.9 gm. (0.022 mol) of piperidine in absolute dimethylformamide was admixed at 0° C. with a solution of 4.5 gm. (0.022 mol) of dicyclohexyl-carbodiimide in dimethylformamide. After standing overnight, the reaction mixture was heated for 8 hours at 40° C., then poured into water, and the aqueous mixture was extracted with chloroform. The crude product obtained by evaporating the chloroform solution was purified by column chromatography on silicagel (benzene:acetone= 5:1). Yield: 0.4 gm. (7% of theory), M.P. 98–99° C.

EXAMPLE 13

Preparation of 4-bromo-cinnamic acid piperidide by method C 5.5 gm. of a 50% sodium hydride suspension in mineral oil (0.114 mol of sodium hydride) were admixed slowly at 20° C. in absolute dioxane with 30.0 gm. (0.114 mol) of diethylphosphone-acetic acid piperidide. In order to complete the carbanion formation, the mixture was heated at 70° C. for 45 minutes. Thereafter, a solution of 17.5 gm. (0.095 mol) of 4-bromo-benzaldehyde in absolute dioxane was added dropwise at room temperature. After heating for 2 hours at 50° C., the reaction mixture was poured into water, the product was extracted with benzene and purified by recrystallization from methanol. 18.6 gm. (66% of theory) of a colorless crystalline compound, M.P. 134° C., were obtained.

EXAMPLE 14

Using a procedure analogous to that described in Example 13, 4-bromo-cinnamic acid morpholide, M.P. 142–144° C. (from benzene/ether), was prepared from 4-bromobenzaldehyde and diethylphosphone-acetic acid morpholide. Yield: 70% of theory.

EXAMPLE 15

Using a procedure analogous to that described in Example 13, 3-bromo-cinnamic acid morpholide, M.P. 80–81° C. (from petroleum-ether), was prepared from 3-bromobenzaldehyde and diethylphosphone-acetic acid morpholide. Yield: 38% of theory.

EXAMPLE 16

4-bromo-cinnamic acid piperidide

A mixture of 30.0 gm. (0.16 mol) of 4-bromobenzaldehyde, 51.0 gm. (0.19 mol) of diethylphosphone-acetic acid piperidide, 34.0 gm. (0.25 mol) of potassium carbonate and 500 ml. of 75% aqueous methanol was heated for 5 hours at the boiling point. After cooling, the reaction mixture was poured into water, and the reaction product was filtered off. It was recrystallized from isopropanol. 43.1 gm. (90% of theory) of 4-bromo-cinnamic acid piperidide were obtained as colorless crystals, M.P. 133–134° C.

EXAMPLE 17

Using a procedure analogous to that described in Example 16, 4-iodo-cinnamic acid morpholide, M.P. 176–178° C. (from methanol) was prepared from 4-iodo-benzaldehyde and diethylphosphone-acetic acid morpholide. Yield: 64% of theory.

EXAMPLE 18

Using a procedure analogous to that described in Example 16, 4-iodo-cinnamic acid piperidide, M.P. 134–135° C. (from methanol) was prepared from 4-iodo-benzaldehyde and diethylphosphone-acetic acid piperidide. Yield: 71% of theory.

EXAMPLE 19

Using a procedure analogous to that described in Example 16, 3-iodo-cinnamic acid morpholide, M.P. 100–101° C., was prepared from 3-iodo-benzaldehyde and diethylphosphone-acetic acid morpholide. Yield: 40% of theory.

EXAMPLE 20

4-bromo-cinnamic acid piperidide

A solution of 5.5 gm. (0.03 mol) of 4-bromobenzaldehyde and 11.7 gm. (0.03 mol) of triphenyl-piperidinocarbonylmethylenephosphorane in 100 ml. of absolute benzene was refluxed at the boiling point for 20 hours. After removal of the solvent in vacuo the triphenylphosphineoxide was separated from the reaction product by extraction with a large amount of low-boiling-point petroleum ether. The residue was recrystallized from methanol and yielded 5.3 gm. (60% of theory) of the pure product, M.P. 134° C.

EXAMPLE 21

4-iodo-cinnamic acid piperidide 7.3 gm. (0.017 mol) of triphenylpiperidino-carbonyl-methyl-phosphonium chloride were added in portions to a suspension of 1.95 gm. (0.017 mol) of potassium-tert.-butylate in absolute dioxane. Subsequently a solution of 4.0 gm. (0.017 mol) of 4-iodobenzaldehyde in absolute dioxane was quickly added dropwise, and the mixture was refluxed for 12 hours. After cooling, it was poured into water, and the aqueous mixture was extracted with chloroform. The crude product obtained by evaporation of the chloroform extract solution was recrystallized several times from isopropanol for purification. Yield: 3.2 gm. (57% of theory), M.P. 134–135° C.

EXAMPLE 22

4-bromo-cinnamic acid piperidide

A suspension of 15.8 gm. (0.07 mol) of 4-bromo-cinnamic acid in absolute toluene was admixed at 20° C. with a solution of 4.5 gm. (0.016 mol) of tripiperidino-phosphine in absolute toluene, and the mixture was heated at 100° C. for 1½ hours. After evaporation of the solvent in vacuo, water was added to the residue, and the product was extracted with ethylacetate. Yield: 3.1 gm. (22% of theory), M.P. 134° C. (from ethylacetate).

EXAMPLE 23

Using a procedure analogous to that described in Example 13, 4-iodo-cinnamic acid piperidide, M.P. 134–135° C., was prepared from 4-iodo-benzaldehyde and diethylphosphone-acetic acid piperidide. Yield: 55% of theory.

EXAMPLE 24

Using a procedure analogous to that described in Example 1, 4-iodo-cinnamic acid morpholide, M.P. 176–178° C., was prepared from 4-iodo-cinnamic acid chloride and morpholine. Yield: 80% of theory.

EXAMPLE 25

Using a procedure analogous to that described in Example 16, 3-iodo-cinnamic acid piperidide, M.P. 109–110° C. (from ethylacetate), was prepared from 3-iodo-benzaldehyde and diethylphosphone-acetic acid piperidide. Yield: 44% of theory.

EXAMPLE 26

Preparation of 4-bromo-cinnamic acid-(4'-hydroxy-piperidide) by method A

A solution of 28.0 gm. (0.115 mol) of 4-bromo-cinnamic acid chloride in chloroform was slowly added dropwise, while stirring, to a solution of 11.6 gm. (0.115 mol) of 4-hydroxypiperidine and 17.3 gm. (0.171 mol) of triethylamine in chloroform. After 3 hours' stirring at 20° C. the reaction mixture was admixed with water and chloroform, and the organic phase was separated and dried over sodium sulfate. After filtration, the solvent was removed in vacuo, and the residue was recrystallized from methanol. 29.0 gm. (82% of theory) of a colorless crystalline compound, M.P. 160–162° C., of the formula

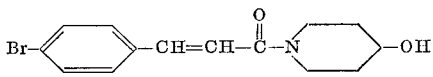

were obtained.

EXAMPLE 27

Using a procedure analogous to that described in Example 26, 3-bromo-cinnamic acid-(4'-hydroxy-piperidide), M.P. 116–117° C. (from ethylacetate), was prepared from 3-bromo-cinnamic acid chloride and 4-hydroxy-piperidine. Yield: 6% of theory.

EXAMPLE 28

Using a procedure analogous to that described in Example 26, 4-iodo-cinnamic acid-(4'-hydroxy-piperidide), M.P. 176–177° C. (from ethanol), was prepared from 4-iodo-cinnamic acid chloride and 4-hydroxypiperidine. Yield: 45% of theory.

EXAMPLE 29

Using a procedure analogous to that described in Example 26, 3-iodo-cinnamic acid-(4'-hydroxy-piperidine), M.P. 126–127° C. (from ethylacetate), was prepared from 3-iodo-cinnamic acid chloride and 4-hydroxypiperidine. Yield: 31.0% of theory.

EXAMPLE 30

Preparation of 4-bromo-cinnamic acid-(4'-hydroxy-piperidide) by method C

A solution of 1.20 gm. (4.31 millimol) diethylphosphone-acetic acid (4'-hydroxypiperidide) [prepared from chloro-acetic acid (4'-hydroxy-piperidide) and sodium diethyl-phosphite] and 0.833 gm. (4.50 millimol) of 4-bromo-benzaldehyde in 20 ml. of dry dioxane was admixed with 0.482 gm. (4.30 millimol) of potassium tert.-butylate. The reaction mixture was heated, while stirring, for two hours at 60° C., and then the brown solution was cooled, diluted with 200 ml. of water, and the aqueous solution was extracted with chloroform. The crude product obtained from the chloroform extract by evaporation in vacuo was purified by column chromatography on silicagel (benzene-acetone=1:1). Upon recrystallization from chloroform/acetone with a small quantity of ether, 0.45 gm. (34% of theory) of colorless crystals, M.P. 159–161° C., were obtained.

EXAMPLE 31

4-bromo-cinnamic acid (4-'hydroxy-piperidide)

A mixture of 0.8 gm. (4.3 millimol) of 4-bromo-benzaldehyde, 1.9 gm. (4.3 millimol) of triphenyl-(4'-hydroxy-piperidino)-carbonylmethyl-phosphonium chloride (M.P. 57–59° C.) [prepared from triphenyl-phosphine and chloroacetic acid (4'-hydroxy-piperidide)], 1.1 gm. (9.9 millimol) of potassium tert.-butylate and 20 ml. of dry dimethylformamide was heated at 50° C. for 14 hours. After cooling, the reaction mixture was poured into water, and the aqueous mixture was extracted with chloroform. The crude product obtained from the chloroform extract by evaporation in vacuo was purified by column chromatography on silicagel (benzene:acetone=2:1). Yield: 0.4 gm. (30% of theory), M.P. 159–161° C.

EXAMPLE 32

4-chloro-cinnamic acid (4'-hydroxy-piperidide) by method A

A solution of 10.0 gm. (0.05 mol) of 4-chloro-cinnamic acid chloride in 50 ml. of chloroform was added dropwise to a solution of 5.0 gm. (0.05 mol) of 4-hydroxy-piperidine and 7.5 gm. (0.075 mol) of triethylamine and 100 ml. of chloroform. After completion of the dropwise addition, the reaction mixture was stirred for 3 hours and was then allowed to stand overnight. The reaction solution was washed with 2 N hydrochloric acid, with 2 N sodium hydroxide and with water. The chloroform phase was separated, dried over sodium sulfate and evaporated in vacuo, and the residue was recrystallized once from methanol and once from ethyl acetate. 9.3 gm. (70% of theory) of 4-chloro-cinnamic acid (4'-hydroxy-piperidide), M.P. 168–170° C., of the formula

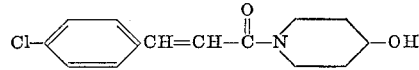

were obtained.

EXAMPLE 33

4-chloro-cinnamic acid (4'-hydroxy-piperidide) by method C 2.5 gm. (8.9 millimol) of diethylphosphone-acetic acid (4'-hydroxy-piperidide) [oily raw product, prepared from chloro-acetic acid (4-hydroxy-piperidide) and sodium diethylphosphite] and 1.4 gm. (10 millimol) of 4-chloro-benzaldehyde were dissolved in 50 ml. of absolute dioxane. 1.0 gm. (8.9 millimol) of potassium tert.-butylate was added, and the reaction mixture was then warmed for 2 hours at 60° C. Thereafter, water was added to the reaction mixture, and the aqueous mixture was extracted with chloroform. The chloroform extract solution was evaporated in vacuo, and the residue was subjected to column-chromatography on silicagel (benzene/acetone=2:1). 670 mgm. (28% of theory) of 4-chloro-cinnamic acid (4'-hydroxy-piperidide), M.P. 167–169° C., were obtained.

EXAMPLE 34

4-chloro-cinnamic acid (4'-hydroxy-piperidide) by method C 5.65 gm. (0.050 mol) of potassium tert.-butylate were added at 20° C. in small portions to a solution of 3.6 gm. (0.025 mol) of 4-chloro-benzaldehyde and 11.0 gm. (0.025 mol) of triphenyl-(4-hydroxy-piperidino)-carbonyl-methyl-phosphonium-chloride [oily raw product, prepared from triphenylphosphine and chloro-acetic acid (4-hydroxy-piperidide)] in absolute dioxane. The reaction mixture was heated for 9 hours at its boiling point, the precipitate formed thereby was filtered off, and the filtrate was evaporated in vacuo, and the residue was dissolved in chloroform. The chloroform solution was extracted with 2 N hydrochloric acid, with 2 N sodium hydroxide and with water, and then dried over sodium sulfate and evaporated in vacuo. The residue was subjected to colum-chromatography on silicagel (benzene/acetone=2:1). 460 mgm. (7% of theory) of 4-chloro-cinnamic acid (4'-hydroxy-piperidide), M.P. 167–168° C., were isolated.

The compounds according to the present invention, that is, those embraced by Formula I above, have useful pharmacodynamic properties. More particularly, they exhibit antiphlogistic and antipyretic activities in warm-blooded animals, such as rats.

The antiphlogistic activity of the compounds of the present invention was tested as their antiexudative effect against the carrageenin-edema in the hind paw of the rat pursuant to the method of Winter et al. [Proc. Soc. Exper. Biol. Med. 111, 544–547 (1962)], and the kaolin-edema in the hind paw of the rat pursuant to the method of Hillebrecht [Arzneimittelforschung 4, 607–614 (1954)] after oral administration of at least three different dosages to at least ten animals per dosage.

The measurement of the antiexudative effect was performed according to the method of Doepfner and Cerletti [Int. Arch. Allergy and Appl. Immun. 12, 89–97 (1958)], and from the raw data the dosage was graphically determined which produces a 35% reduction ($ED_{35}$) of the induced swelling. The following table shows representative results of these tests.

A=4-bromo-cinnamic acid piperidide
B=3-bromo-cinnamic acid piperidide
C=4-iodo-cinnamic acid piperidide
D=4-iodo-cinnamic acid morpholide
E=4-chloro-cinnamic acid (4'-hydroxy-piperidide)
F=4-bromo-cinnamic acid (4'-hydroxy-piperidide)

TABLE I

| Compound | Carageenin-edma antiexudative $ED_{35}$, mgm./kg. | Kaolin-edema antiexudative $ED_{35}$, mgm./kg. |
| --- | --- | --- |
| A | 35 | 47 |
| B | 68 | |
| C | 61 | 115 |
| D | 110 | 100 |
| E | 31 | 55 |
| F | 51 | 73 |

The antipyretic activity of the compounds according to the present invention was ascertained by orally administering at least four different dosages of each compound to at least 6 adult, normothermic laboratory rats, calculating the average maximum body temperature reduction for each dosage, and determining by graphic interpolation for each compound the dose which produces a reduction of the body temperature by 1.5° C. ($ED_{-1.5°\ C.}$). The following table shows representative results obtained from these tests.

TABLE II

| Compound: | $ED_{-1.5°\ C.}$, mgm./kg. |
| --- | --- |
| A | 13 |
| B | 24 |
| C | 8 |
| D | 4 |
| E | 5.5 |
| F | 7 |

The acute toxicity of the compounds according to the present invention was determined by perorally administering at least three different dosages each to groups of at least ten adult laboratory rats, and calculating from the raw data the median lethal dose ($LD_{50}$), i.e. the dose which causes 50% of the animals to die within fourteen days after administration of the test compound. The following representative results were obtained.

TABLE III

| Compound: | $LD_{50}$, gm./kg. |
| --- | --- |
| A | 4.6 |
| B | >5.0 |
| C | >5.0 |
| D | >5.0 |
| E | ~5.0 |
| F | ~5.0 |

Finally, the therapeutic ratio with respect to the antiphlogistic activity, i.e. the quotient $LD_{50}/ED_{35}$, was calculated for each compound. The following table shows the therapeutic ratios for compounds A through F above.

TABLE IV

| Compound | Therapeutic ratio $LD_{50}/ED_{35}$ realtive to— | |
| --- | --- | --- |
| | Carrageenin-edema | Kaolin-edema |
| A | 131 | 98 |
| B | >74 | |
| C | >82 | >43 |
| D | >45 | >50 |
| E | ~160 | ~91 |
| F | ~98 | ~68 |

The test results clearly show that the compounds of the instant invention are very effective antiphologistics and antipyretics with low acute toxicities and very favorable therapeutic ratios.

For pharmaceutical purposes the compounds according to the present invention are administered to warm-blooded animals perorally or parentetally as sole active ingredients or together with other active ingredients in customary dosage unit compositions, that is, compositions in dosage unit form consisting essentially of an inert pharmaceutical carrier and on effective dosage unit of the active ingredient, such as tablets, coated pills, capsules, wafers, powders, solutions, suspensions, emulsions, syrups, suppositories and the like. One effective dosage unit of the compounds according to the present invention is from 3.3 to 10.0 mgm./kg. body weight, preferably 5.0 to 6.7 mgm./kg. body weight. The daily dose range is from 6.7 to 20 mgm./kg., preferably 10.0 to 13.4 mgm./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 35

Tablets

The tablet composition was compounded from the following ingredients:

| | Parts |
|---|---|
| 4-bromo-cinnamic acid piperidide | 300.0 |
| Corn starch | 30.0 |
| Polyvinylpyrrolidone | 10.0 |
| Celluluose, microcrystalline | 50.0 |
| Colloidal silicic acid | 5.0 |
| Magnesium stearate | 5.0 |
| Total | 400.0 |

Compounding procedure

The cinnamic acid piperidide was thoroughly admixed with the corn starch, the mixture was moistened with an ethanolic 10% solution of the polyvinylpyrrolidone, the moist mass was forced through a 1.5 mm.-mesh screen, and the granulate thus obtained was dried at 40° C. The dry granulate was again passed through the screen, admixed with the remaining ingredients, and the mixture was pressed into 400 mgm.-tablets. Each tablet contained 300 mgm. of the cinnamic acid piperidide.

EXAMPLE 36

Coated pills

The tablets obtained in Example 35 were coated with a thin shell consisting essentially of sugar and talcum, and the coated tablets were polished with beeswax, all according to customary methods. Each coated tablet contained the same amount of active ingredient.

EXAMPLE 37

Suppositories

The suppository composition was compounded from the following ingredients:

| | Parts |
|---|---|
| 4-bromo-cinnamic acid piperidide | 400.0 |
| Cocoa butter | 1350.0 |
| Total | 1750.0 |

Compounding procedure

The cocoa butter was melted and cooled to 40° C., and the cinnamic acid piperidide, in finely pulverized form, was stirred into it with the aid of an immersion homogenizer. The mixture was then poured at 38° C. into cooled suppository molds, each holding 1750 mgm. of the mixture. Each suppository contained 400 mgm. of the cinnamic acid piperidide.

EXAMPLE 38

Suppositories with combination of active ingredients

The suppository composition was compounded from the following ingredients:

| | Parts |
|---|---|
| 4-bromo-cinnamic acid piperidide | 50.0 |
| 5-(1-cyclohepten-1-yl)-5-ethyl-barbituric acid | 60.0 |
| Cocoa butter | 890.0 |
| Total | 1000.0 |

Compounding procedure

The cocoa butter was melted and cooled to 40° C., and the cinnamic acid piperdide and the barbituric acid compound, in finely pulverized form, were stirred into it with the aid of an immersion homogenizer. The mixture was then poured at 38° C. into cooled suppository molds, each holding 1000 mgm. of the mixture. Each suppository contained 50 mgm. of the cinnamic acid piperidide and 60 mgm. of the barbituric acid compound.

EXAMPLE 39

Tablets with combination of active ingredients

The tablet composition was compounded from the following ingredients:

| | Parts |
|---|---|
| 4-bromo-cinnamic acid piperidide | 300.0 |
| Caffeine | 50.0 |
| Phenyl-ethyl-barbituric acid | 25.0 |
| Codeine phosphate | 10.0 |
| Potato starch | 100.0 |
| Carboxymethyl cellulose, low viscosity | 7.0 |
| Cellulose, microcrystalline | 103.0 |
| Magnesium stearate | 5.0 |
| Total | 600.0 |

Compounding procedure

The cinnamic acid piperidide, the caffeine, the barbituric acid compound and the potato starch were intimately admixed with each other, the mixture was moistened with an aqueous 5% solution of the carboxymethyl cellulose, the moist mass was forced through a 1.5 mm.-mesh screen, and the granulate thus obtained was dried at 40° C. The dry granulate was again passed through the screen, admixed with the remaining ingredients, and the mixture was pressed into 600 mgm.-tablets. Each tablet contained 300 mgm. of the cinnamic acid compound, 50 mgm. of caffeine, 25 mgm. of phenyl-ethyl-barbituric acid and 10 mgm. of codeine phosphate.

EXAMPLE 40

Aqueous suspension with combination of active ingredients

The suspension was compounded from the following ingredients:

| | Parts |
|---|---|
| 4-bromo-cinnamic acid piperidide | 4.00 |
| N - cyclohexyl - N-methyl-(2-amino-3,5-dibromo-benzyl)-ammonium chloride | 0.08 |
| Citric acid | 2.35 |
| Sodium hydroxide | 1.30 |
| Dioctyl sodium sulfosuccinate | 0.02 |
| Benzoic acid | 0.10 |
| Sodium cyclamate | 0.20 |
| Magnesium-aluminum-silicate | 0.80 |
| Polyvinylpyrrolidone | 0.10 |
| Sorbitol | 20.00 |
| Glycerin | 10.00 |
| Flavoring, juniper berry | 0.10 |
| Distilled water | 74.45 |
| Total | 113.50 |

Compounding procedure

The dioctyl sodium sulfosuccinate was dissolved in about 15% of the indicated amount of distilled water, and the cinnamic acid piperidide and the ammonium chloride compound, both in finely powdered form, was suspended in the aqueous solution. The remaining amount of water was heated to 80° C., the magnesium-aluminium-silicate was suspended therein, and then the citric acid, the sodium hydroxide, the benzoic acid, the sodium cyclamate, the sorbitol and the polyvinylpyrrolidone were successively dissolved in the suspension. The resulting solution was cooled to room temperature, and the glycerin, the flavoring and the active ingredient suspension were stirred into it. The finished suspension was homogenized. 5 ml. of the homogenized suspension contained 200 mgm. of the cinnamic acid piperidide and 4 mgm. of the ammonium chloride compound.

Analogous results were obtained when an equal amount of any one of the other compounds embraced by Formula I above was substituted for the particular cinnamic acid piperidide compound in Examples 35 through 40. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. 4-bromo-cinnamic acid piperidide.
2. 4-bromo-cinnamic acid (4'-hydroxy-piperidide).
3. 4-chloro-cinnamic acid (4'-hydroxy-piperidide).

References Cited

Chemical Abstracts, vol. 57, col. 7226 (1962) (Abstract of Dymek et al.).

Turbanti et al., Chimie Therapeutique, September-October 1967, No. 5, pp. 354–365.

JOHN D. RANDOLPH, Primary Examiner

U.S. Cl. X.R.

260—247, 247.7, 293, 294.7, 544, 546; 424—248, 267